Figure 1:
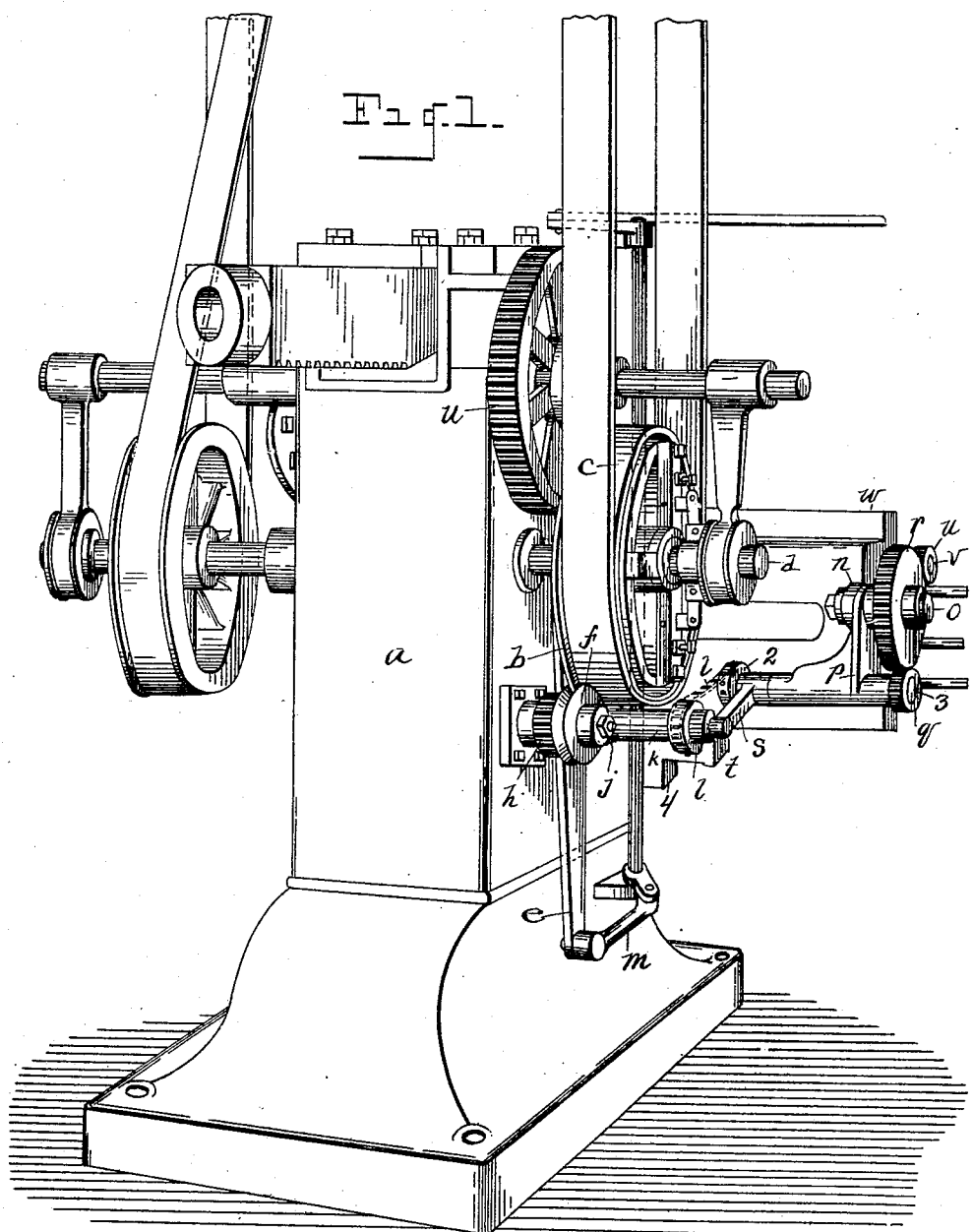

H. E. MORTON.
ATTACHMENT FOR DRAW CUT SHAPERS.
APPLICATION FILED MAR. 12, 1907.

910,216.

Patented Jan. 19, 1909.
3 SHEETS—SHEET 1.

WITNESSES
Q. B. Baenziger.
E. M. Spielberg.

INVENTOR
Henry E. Morton
By Newell S. Wright
Attorney

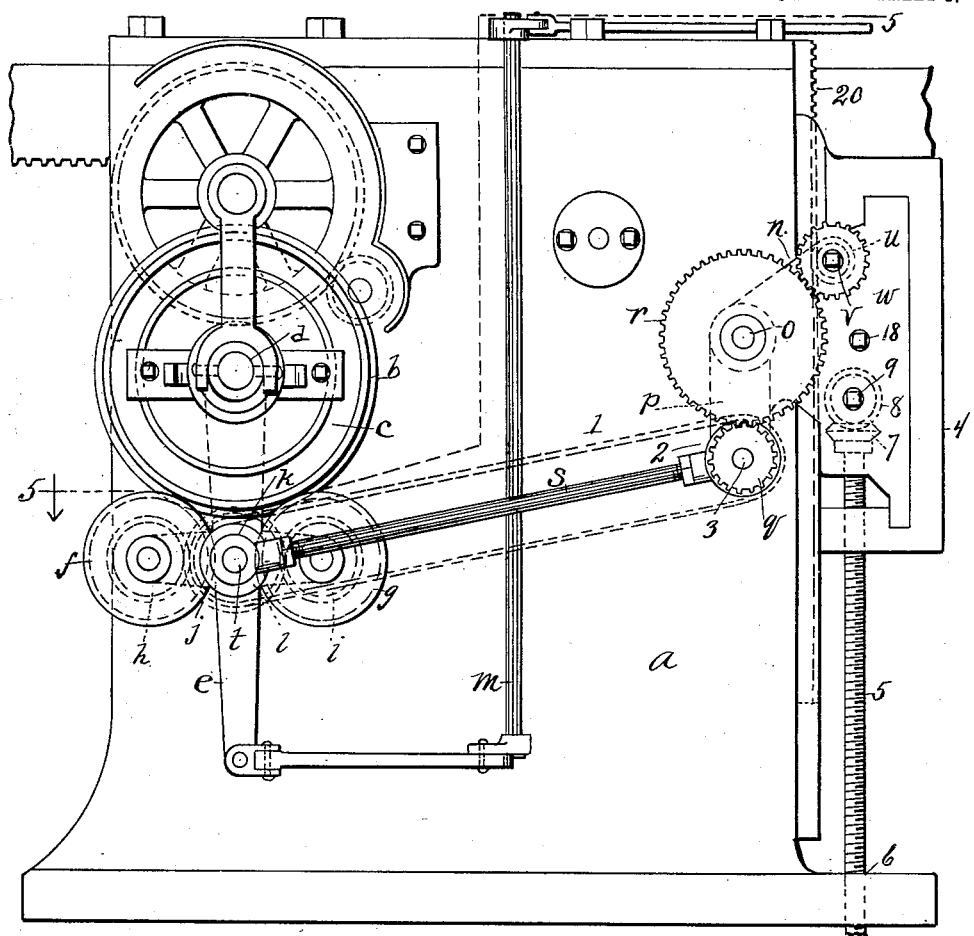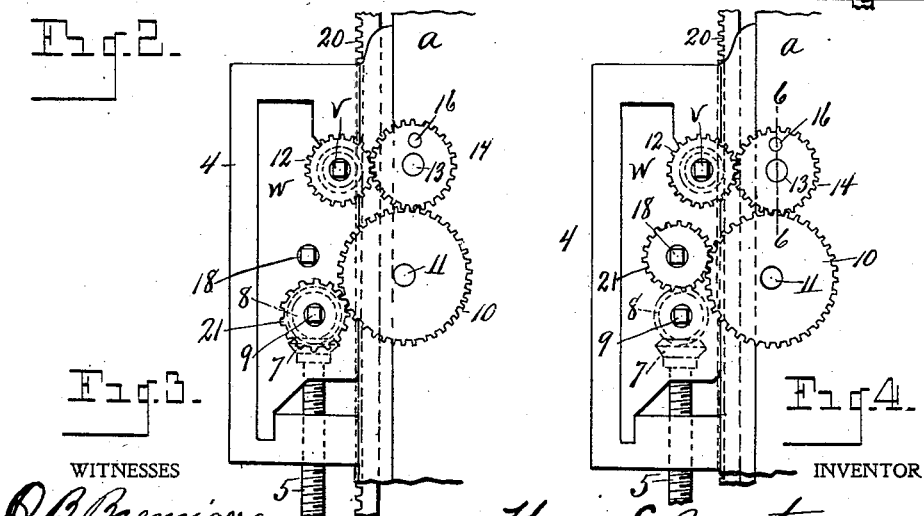

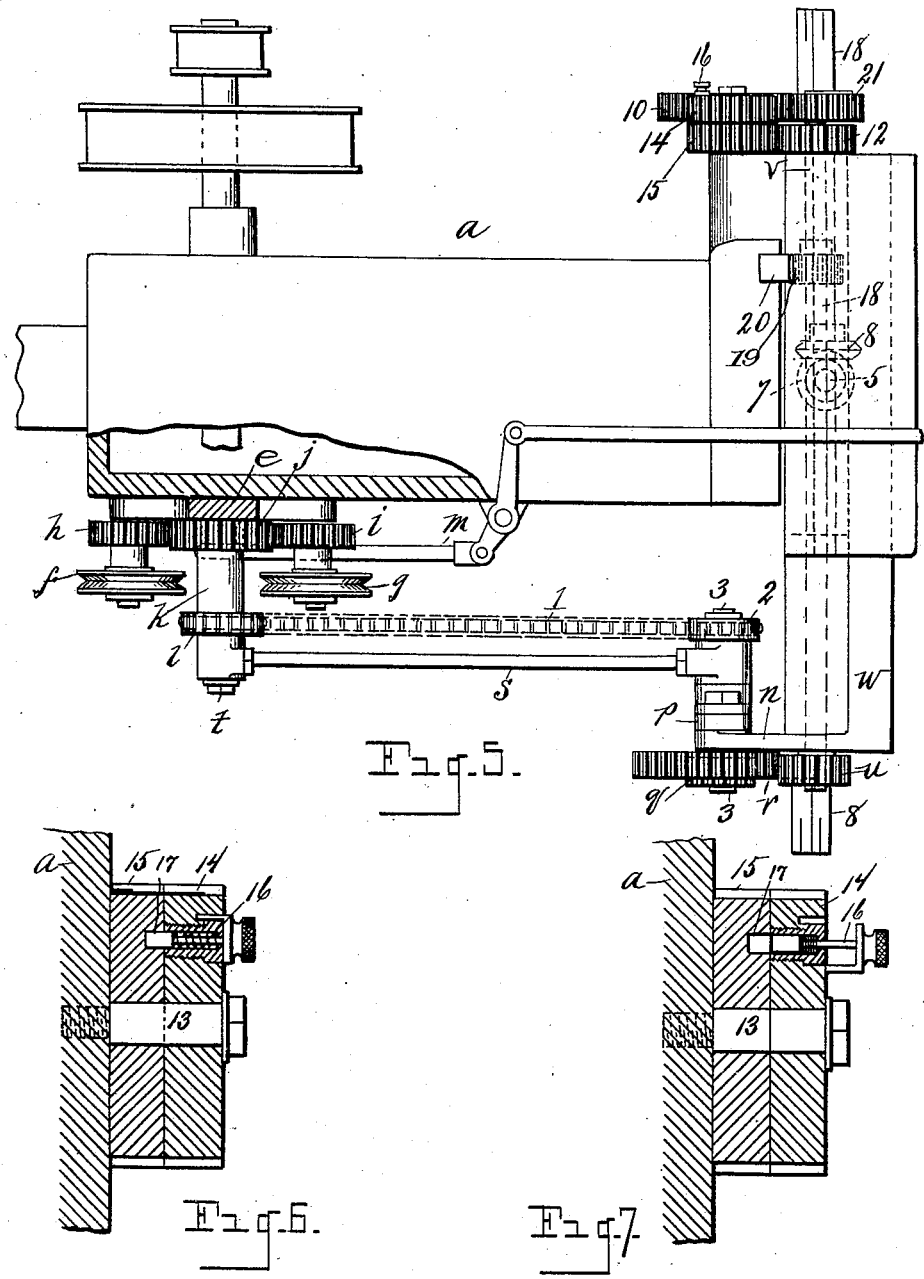

UNITED STATES PATENT OFFICE.

HENRY E. MORTON, OF MUSKEGON HEIGHTS, MICHIGAN.

ATTACHMENT FOR DRAW-CUT SHAPERS.

No. 910,216.  Specification of Letters Patent.  Patented Jan. 19, 1909.

Application filed March 12, 1907. Serial No. 361,990.

*To all whom it may concern:*

Be it known that I, HENRY E. MORTON, a citizen of the United States, residing at Muskegon Heights, county of Muskegon, State of Michigan, have invented a certain new and useful Improvement in Attachments for Draw-Cut Shapers, of which the following is a specification, reference being had to the accompanying drawings, which form a part of this specification.

This invention has for its object a novel attachment for a draw cut shaper and analogous implements, the same being more particularly designed as a power hoisting or moving device, and it consists of the construction, combination and arrangement of devices hereinafter described and claimed and illustrated in the accompanying drawings, in which, Figure 1 is a view in perspective. Fig. 2 is a view in side elevation. Fig. 3 is a detail view in elevation showing certain features of the mechanism in operation from the side opposite that shown in Fig. 2. Fig. 4 is a view similar to Fig. 3, but showing other features in operative position. Fig. 5 is a view in section on the line 5—5, Fig. 2. Fig. 6 is a detail view in section on the line 6—6, Fig. 4, showing the two portions of the double gear in engaged position. Fig. 7 is a similar view to Fig. 6, but showing the two portions of the double gear, the one disengaged from the other.

The shaper may be of any desired construction. It may consist, for example, of the mechanism shown and described in a pending application filed by Mathew Morton, May 15, 1905, Serial No. 260,538, although the present attachment is applicable to other shapers and analogous implements.

In the drawings $a$ represents any suitable shaper to which my invention is applied. The attachment as shown consists of a friction disk $b$ V'd or grooved on its periphery, or otherwise constructed in an analogous manner, said disk either being attached to a pulley $c$, or made a part of the pulley, which furnishes the driving power to the machine, as shown herewith, said pulley and disk being journaled on a shaft $d$. Projecting beneath said disk is an arm or frame indicated at $e$ carrying two friction rollers $f$ and $g$ either V'd or grooved on their peripheries as may be desired, or otherwise constructed to correspond with the periphery of the disk $b$, said friction rollers being so located that when the arm or frame $e$ stands in a vertical position, neither of said friction rollers will come in contact with the disk. Each of the friction rollers is provided with a pinion indicated at $h$ and $i$, respectively, meshing into a gear $j$ which is provided with a hub indicated at $k$, upon which is a sprocket or other suitable driving device indicated at $l$. A sprocket mechanism is shown herewith, for a chain drive, the sprocket chain 1 being engaged upon an additional sprocket wheel 2, upon an arbor 3. On either side the corresponding roller, by means of its pinion, is engaged with the intermediate gear $j$, which changes the direction of rotation, the mechanism being so arranged that when one roller is brought into contact with the friction disk, the mechanism is made to rotate in one direction, and so that when the other roller is brought into contact with the friction disk, the mechanism will rotate in the opposite direction. The arm or frame $e$ may be oscillated as desired by any suitable means, as by a lever mechanism $m$.

The shaper is provided with a vertically movable cross rail indicated at $w$, and with a saddle 4 movable crosswise of the shaper upon the cross rail.

The cross rail is provided with a bracket indicated at $n$, on which is a swinging bracket arm $p$ carrying the shaft 3 upon which is a pinion $q$. Said bracket also carries an intermediate gear indicated at $r$ upon an arbor $o$, the arm carrying said pinion rotating from the center or from the shaft 3. The bracket on the cross rail moves vertically with the cross rail, the bracket arm $p$ compensating for the difference in the center distances. A rod $s$ connects the shaft 3 carried by the swinging bracket arm $p$ with the end of the shaft $t$, upon which the frame $e$ is fulcrumed, thereby regulating the center distances so that they will not change when the cross rail is raised and lowered. A pinion $u$ upon a through shaft $v$ engages the intermediate gear $r$. By said shaft $v$ power may be carried through to the opposite end of the cross rail at the opposite side of the shaper, where it may engage the regular feeding gears with which the shaper is commonly provided which actuate the hoisting shaft, thereby making it possible to raise and lower the cross rail by power at the will of the operator.

A vertical threaded hoisting shaft carried by the cross rail is shown at 5 passing downward through the base of the machine and having a threaded engagement with said base as at 6, said shaft being provided with a bevel gear 7 meshing with a bevel gear 8 upon a horizontal shaft 9. Upon the end of the shaft $v$ opposite that shown in Fig. 2 is a gear 12 arranged to mesh with a double gear upon an arbor 13, the double gear being formed of two parts indicated at 14 and 15, the one being disengageable from the other in any suitable manner. For example, the portion 14 is shown provided with a spring actuated pin 16 engageable in a socket 17 in the adjacent portion 15, said pin being capable of being withdrawn from the socket to rest upon the adjacent face of the gear 15. A shaft 18 extends horizontally of the machine provided with a pinion 19 meshing with the customary rack bar 20 of the shaper which operates the pinion $u$ upon the shaft $v$.

My invention contemplates the use of an interchangeable gear indicated at 21 in Figs. 3, 4 and 5, to mesh with an intermediate gear 10 upon an arbor 11. This interchangeable gear 21 is intended to be applied either to the shaft 9 or to the shaft 18, as may be required. If the interchangeable gear be applied to the shaft 9, it will mesh with the gear 10 and actuate the bevel gear 7 to actuate the vertical screw 5, thereby raising or lowering the cross rail vertically on the column of the shaper. If the interchangeable gear 21 be applied to the shaft 18, obviously it will mesh with the intermediate gear 10 and drive the horizontal shaft 18 to move the saddle 4 horizontally of the machine.

In Fig. 3 the shaft $v$ extends from side to side of the machine, its pinion meshing with the double gear which transmits the power through the double gear to the intermediate gear 10 to actuate the vertical threaded shaft 5. In Fig. 4 the pinion 12 on the shaft $v$ meshes with the double gear and with the intermediate gear 10, which meshes with the gear upon the shaft 18 to move the saddle horizontally. Obviously, in Fig. 4 the vertical threaded shaft is disconnected and the horizontal shaft is connected with the intermediate gear. In Fig. 3 the horizontal shaft 18 is disconnected and the vertical shaft is connected with the intermediate gear.

If the operator wants to work the device he uses the lever mechanism $m$ to move the cross rail up or down, or the saddle horizontally in either direction, as may be desired. By said lever mechanism he is able to actuate the gears in either direction. In this manner he may move the cross rail or saddle as desired by power. If he wishes to actuate the cross rail or saddle by hand, he simply disconnects the two portions of the double gear and then nothing is driven by power. The object of this is to save time and labor in raising and lowering the cross rail and moving the saddle sidewise by power instead of by hand, leaving the mechanism, however, still capable of being actuated by hand. For example, after the machine has taken a cut on a piece of work, feeding automatically sidewise, say thirty inches, instead of the operator turning the corresponding screw of the crank by hand to bring the work back to the former position for the finishing cut, by manipulating the lever mechanism $m$ he is enabled to apply power to move the work back rapidly. If he wishes to work the device by hand he may attach the crank to the ends of either of the shafts 9 or 18, as the case may be. The same obviously applies to taking vertical cuts.

It will be obvious that the horizontal shaft 18 and the vertical shaft 5 would never be both actuated at the same time. By disengaging his double gears, the operator may crank the mechanism back either horizontally or vertically, as may be required.

While I have shown a sprocket chain drive, I would have it definitely understood that I do not limit myself solely thereto, as other means of transmission might be used to accomplish the same purpose.

What I claim as my invention is:

1. The combination with a machine of the class described provided with feeding mechanism, a vertically movable cross rail and a horizontally movable saddle, of a through shaft extending from side to side of the machine, geared with the feeding mechanism, a horizontal shaft to move the saddle, a vertical shaft to move the cross rail, a gear upon the through shaft, a double gear formed of two parts the one disengageable from the other meshing with the first named gear, pinions upon the horizontal shaft and upon the vertical shaft respectively, an intermediate gear, an interchangeable gear to be applied to either the horizontal shaft or to the vertical shaft to mesh with the intermediate gear, and power moving mechanism to engage the gear upon the through shaft.

2. The combination with a machine of the class described, of a vertically movable cross rail, a horizontally movable saddle, mechanism to raise and lower the cross rail and to move the saddle, a shaft to actuate said mechanism carried by the cross rail, a gear upon said shaft, an intermediate gear carried by the cross rail meshing with said gear, a swinging bracket arm swinging upon the shaft of the intermediate gear, a gear carried by the swinging bracket arm meshing with the intermediate gear, power moving mechanism comprising a rod engaged with the gear upon the swinging arm, oscillatory reversing mechanism comprising driving mechanism connected with the swinging arm to actuate said rod, and lever mechanism to actuate said reversing mechanism, said swinging bracket arm compensating for the difference in the center distances when the cross rail is raised and lowered.

3. The combination with a machine of the class described, of a vertically movable cross rail, a horizontally movable saddle, mechanism to raise and lower the cross rail and to move the saddle a shaft to actuate said mechanism carried by the cross rail, a gear upon said shaft, an intermediate gear carried by the cross rail meshing with said gear, a swinging bracket arm swinging upon the shaft of the intermediate gear, a gear carried by the swinging bracket arm and meshing with the intermediate gear, power moving mechanism comprising a rod engaged with the gear upon the swinging arm, oscillatory reversible friction mechanism comprising driving mechanism connected with the swinging arm to actuate said rod, and lever mechanism to actuate the friction mechanism, the swinging bracket arm and the oscillatory friction mechanism regulating the center distances when the cross arm is raised and lowered.

4. The combination with a machine of the class described, of a vertically movable cross rail, a horizontally movable saddle, mechanism to raise and lower the cross rail and to move the saddle, a shaft geared with said mechanism, a gear upon said shaft, an intermediate gear carried by the cross rail meshing with said gear, a swinging bracket arm swinging upon the shaft of the intermediate gear, a gear carried by the swinging bracket arm meshing with the intermediate gear, an oscillatory frame fulcrumed upon the shaft of the intermediate gear, a rod engaged with the gear upon the swinging arm and with said frame, a friction disk, arbors provided with friction rolls carried by said frame arranged normally out of contact with said friction disk and to be brought one by one into engagement with the friction disk at the will of the operator to reverse the movement of the cross rail and of the saddle, pinions carried by said arbors, an intermediate gear in mesh with said pinions, a driving connection between the friction disk and the gear upon the swinging bracket arm, and mechanism to actuate said swinging frame.

5. The combination with a machine of the class described of a vertically movable cross rail, a horizontally movable saddle, mechanism to raise and lower the cross rail and to move the saddle, a shaft to actuate said mechanism carried by the cross rail, a gear upon said shaft, an intermediate gear carried by the cross rail meshing with said gear, a swinging bracket arm swinging upon the shaft of the intermediate gear, a gear carried by the swinging bracket arm meshing with the intermediate gear, a rotatable friction disk, an oscillatory frame, friction rollers carried by said frame normally out of contact with the friction disk whereby either of said rollers may be brought into engagement with the friction disk, a gear carried upon the oscillatory frame provided with a hub, pinions meshing with the last named gear to change the direction of rotation, means to connect said hub with the swinging arm, and driving mechanism mounted upon said hub to drive the gear carried by the swinging bracket arm, said swinging bracket arm compensating for the difference in the center distances when the cross rail is raised and lowered.

6. The combination with a machine of the class described of a vertically movable cross rail, a horizontally movable saddle, mechanism to raise and lower the cross rail and to move the saddle, a shaft to actuate said mechanism carried by the cross rail, a gear upon said shaft, an intermediate gear carried by the cross rail meshing with said gear, a bracket upon the cross rail movable with the cross rail, a swinging bracket arm swinging upon the shaft of the intermediate gear, an arbor carried by the swinging bracket arm, a gear carried by the swinging bracket arm meshing with the intermediate gear, a rotatable friction disk, an oscillatory frame, friction rollers carried by said frame normally out of contact with the friction disk whereby either of said rollers may be brought into engagement with the friction disk, a gear carried upon the oscillatory frame provided with a hub, pinions meshing with the last named gear to change the direction of rotation, means to connect said hub with the swinging arm, and driving mechanism mounted upon said hub to drive the gear carried by the swinging bracket arm, said swinging bracket arm compensating for the difference in the center distances when the cross rail is raised and lowered.

In testimony whereof, I have signed this specification in the presence of two subscribing witnesses.

HENRY E. MORTON.

Witnesses:
GARRIT VANDER SIELL,
ALEXANDER VAN ZANTEN.